July 5, 1938.  H. B. ELDRIDGE ET AL  2,122,978
MACHINE FOR GRINDING CLUTCH FACINGS AND THE LIKE
Filed April 18, 1936  6 Sheets-Sheet 2

INVENTOR.
H.B.Eldridge,
BY C.E.Klein.
ATTORNEY.

July 5, 1938.  H. B. ELDRIDGE ET AL  2,122,978
MACHINE FOR GRINDING CLUTCH FACINGS AND THE LIKE
Filed April 18, 1936  6 Sheets-Sheet 3

INVENTOR.
H. B. Eldridge.
C. E. Klein.
BY
ATTORNEY.

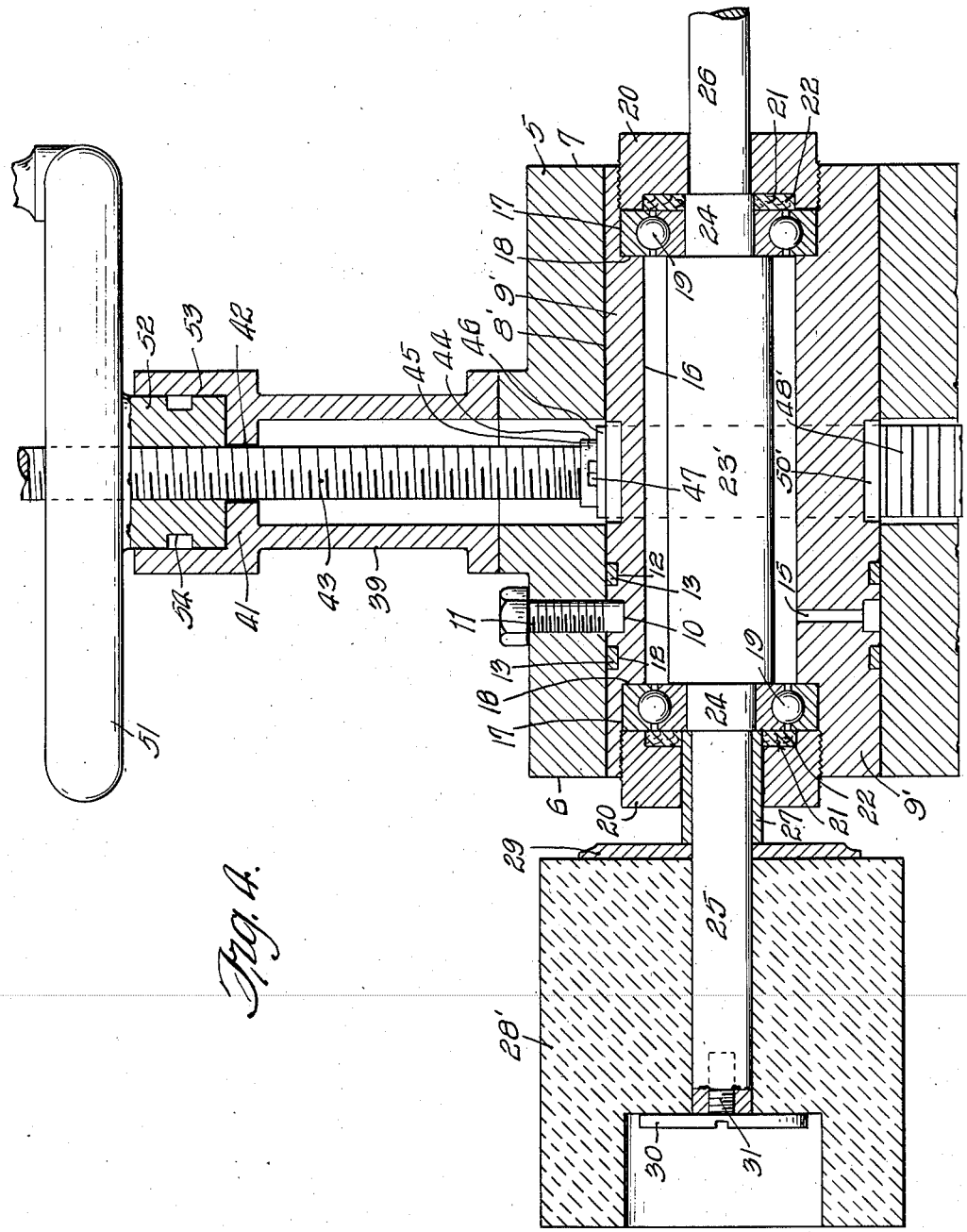

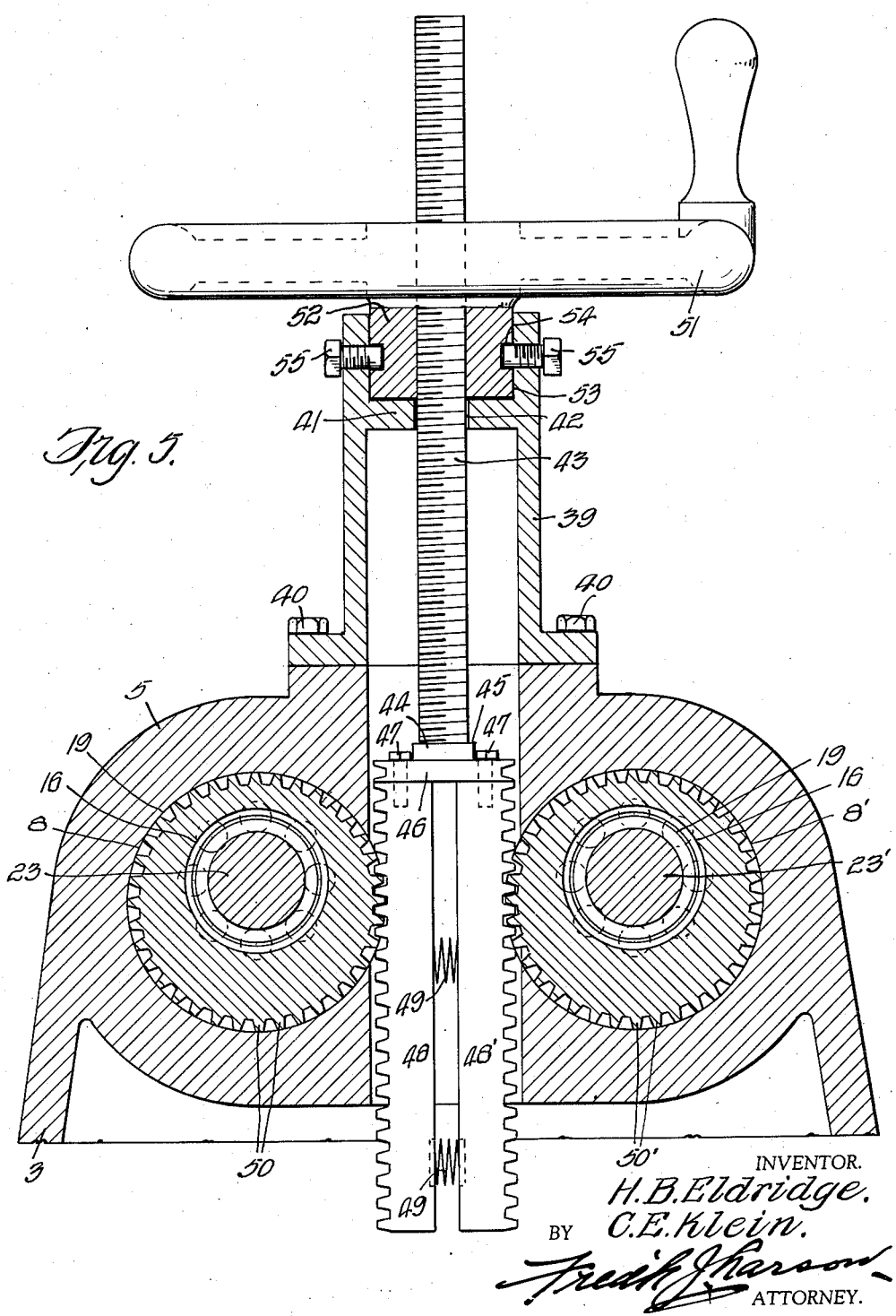

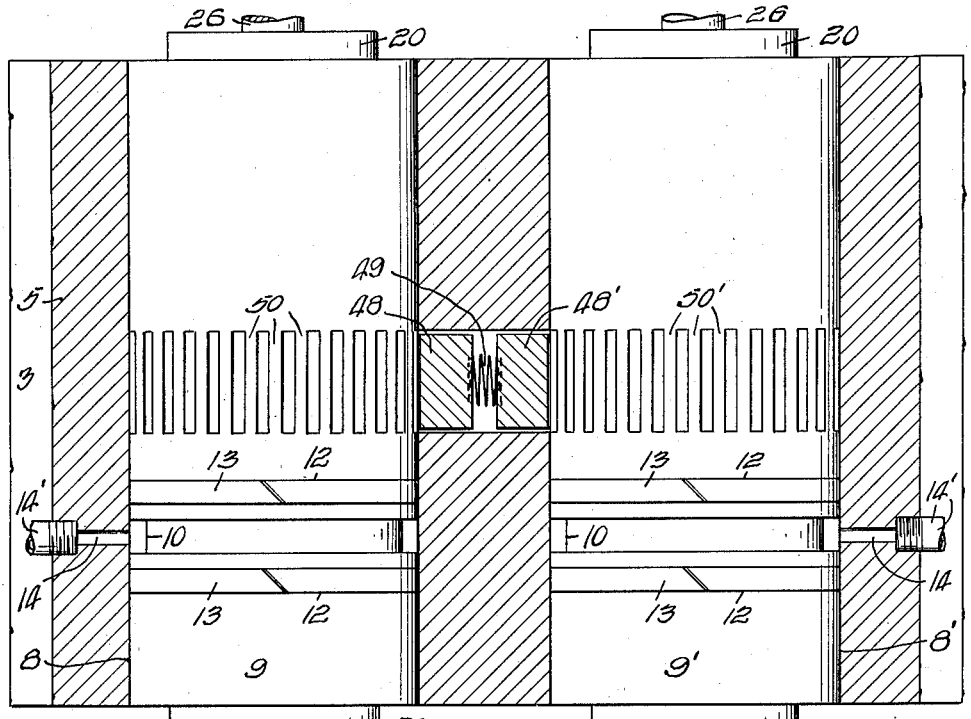
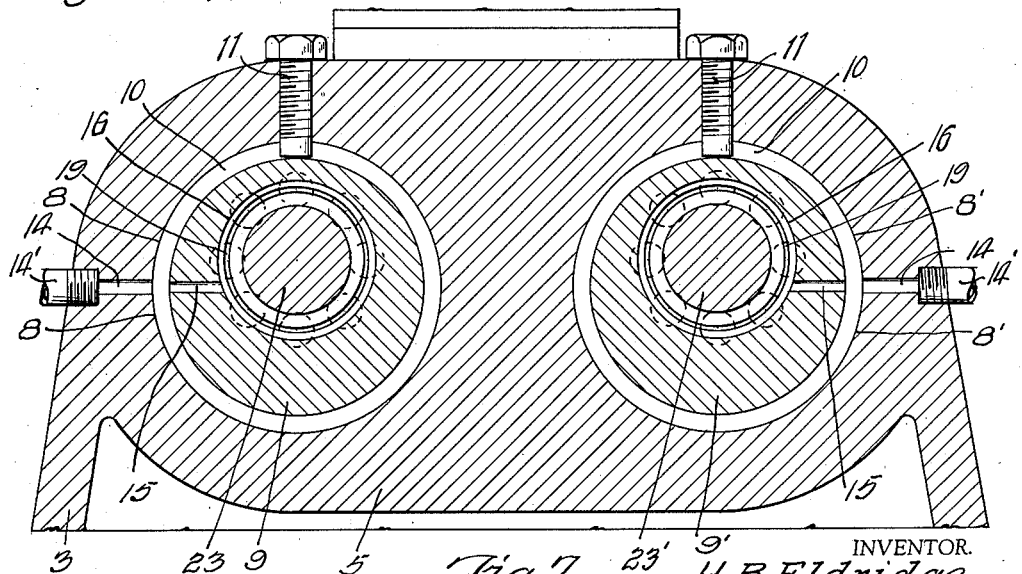

Patented July 5, 1938

2,122,978

UNITED STATES PATENT OFFICE 2,122,978

MACHINE FOR GRINDING CLUTCH FACINGS AND THE LIKE

Howard B. Eldridge and Carl E. Klein, St. Louis, Mo.

Application April 18, 1936, Serial No. 75,166

8 Claims. (Cl. 51—89)

Our present invention relating, as indicated, to clutch servicing devices, has more particular reference to a machine for grinding clutch facings before, or after being secured to an automotive clutch plate, or the like, and for grinding other friction material, such, for instance as brake lining or the like, to smooth the gripping surfaces thereof by reducing the thickness of the faced friction material to a uniform thickness throughout so that the surfaces thereof will be substantially parallel to one another.

It is well known that in the art of automotive and like friction clutches, that the clutch plates which transmit the driving torque, must contact uniformly and evenly with each other in order to produce a smooth and non-vibrational driving engagement. While the proper adjustment and alignment of the actuating parts of a friction clutch assembly are of paramount importance, the benefits of such adjustment are lost, as far as the efficiency and proper performance of the clutch is concerned when high points and ununiform surface portions of the clutch plate facings are present after the facings are secured to the clutch plate.

It has not been possible for service station and repair men to satisfactorily reface clutch plates because punching out rivets to remove the plate facings distort the plate, causing it to wabble, and, after new facings are applied thereto they do not perform satisfactorily because the plate is distorted, and, even if the plates are trued so as not to wabble, when rotating, and thereafter a new facing, or facings is applied thereto, it is found that the facings are not of uniform thickness and perfect flatness, or smoothness, and that they will not perform satisfactorily after being installed in a clutch assembly unless first accurately straightening the plate to prevent wabbling thereof, without facings thereon, and then grinding the facings after being secured to the plate to exactly the proper thickness and perfect flatness so that both faces will be smooth and parallel to one another.

It is the general object and nature of our invention to provide a machine for use in accurately servicing automotive clutch plates before and after clutch facings are secured thereto, and to smooth the faces of brake linings and similar friction material, and which shall be capable of rapidly and precisely facilitating the operations of truing clutch plates of whatever design, and the smoothing of clutch facings secured thereto.

A still further object of the invention is to provide means whereby to reduce the outside diameter, or over all width of a clutch plate by grinding same to any predetermined size.

Briefly outlined, our invention consists of a table, a supporting member on the table, a pair of grinding wheels rotatably mounted eccentric to sleeves journaled in the supporting member, means for imparting motion to the sleeves to move the grinding wheels toward and away from each other, supporting means for rotatably supporting a clutch plate to true the same before or after clutch facings are secured thereto, means for moving the clutch plate, when provided with facings, toward and away from and between the grinding wheels, and means for swinging the clutch plate with its facings into various angles relative to the axis of the grinding wheels.

With the above and other objects in view, the invention consists in the novel features of construction, arrangement and combination of parts hereinafter more fully described and finally pointed out in the claims hereto appended.

The annexed drawings and the following description setting forth in detail the mechanism embodying the invention, constitute, however, but one embodiment of the various mechanically equivalent forms in which the principle of the invention may be used.

In the annexed drawings:

Fig. 4 is a longitudinal sectional elevation of the top portion of the machine clearly showing mechanism for rotating one of the grinding wheels, and turning the sleeves supporting the driven shafts carrying the grinding wheels which are eccentrically mounted relative to the sleeves.

Fig. 5 is a transverse sectional view of that portion of the machine shown in Fig. 4.

Fig. 6 is a horizontal sectional view of the grinding wheel supporting head showing the sleeves in plan view.

Fig. 7 is a vertical sectional view of the grinding wheel supporting head of the machine.

Figure 1:
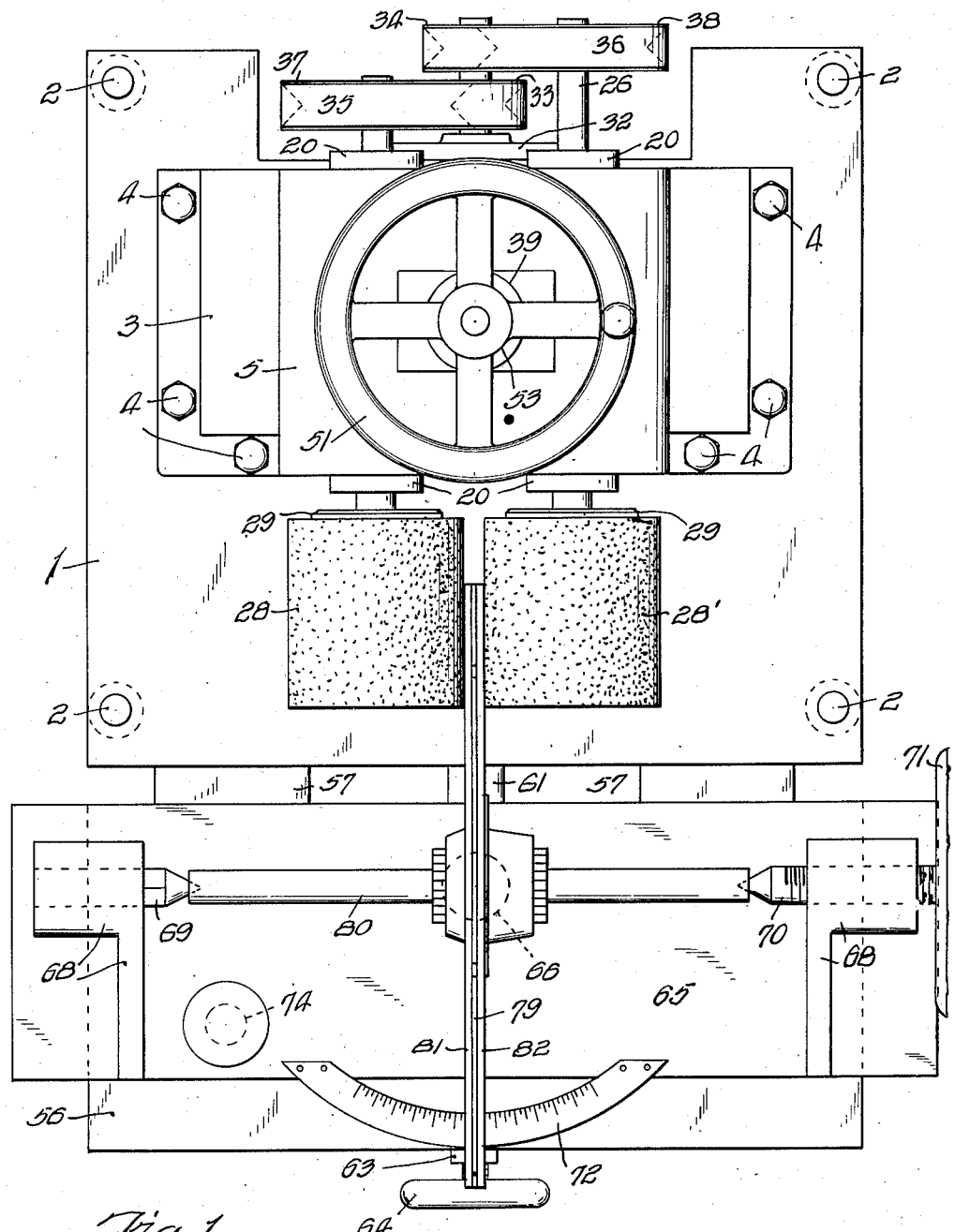
Fig. 1 is a top plan view of a clutch facing, or the like grinding machine embodying the features of our invention.
Figure 2:
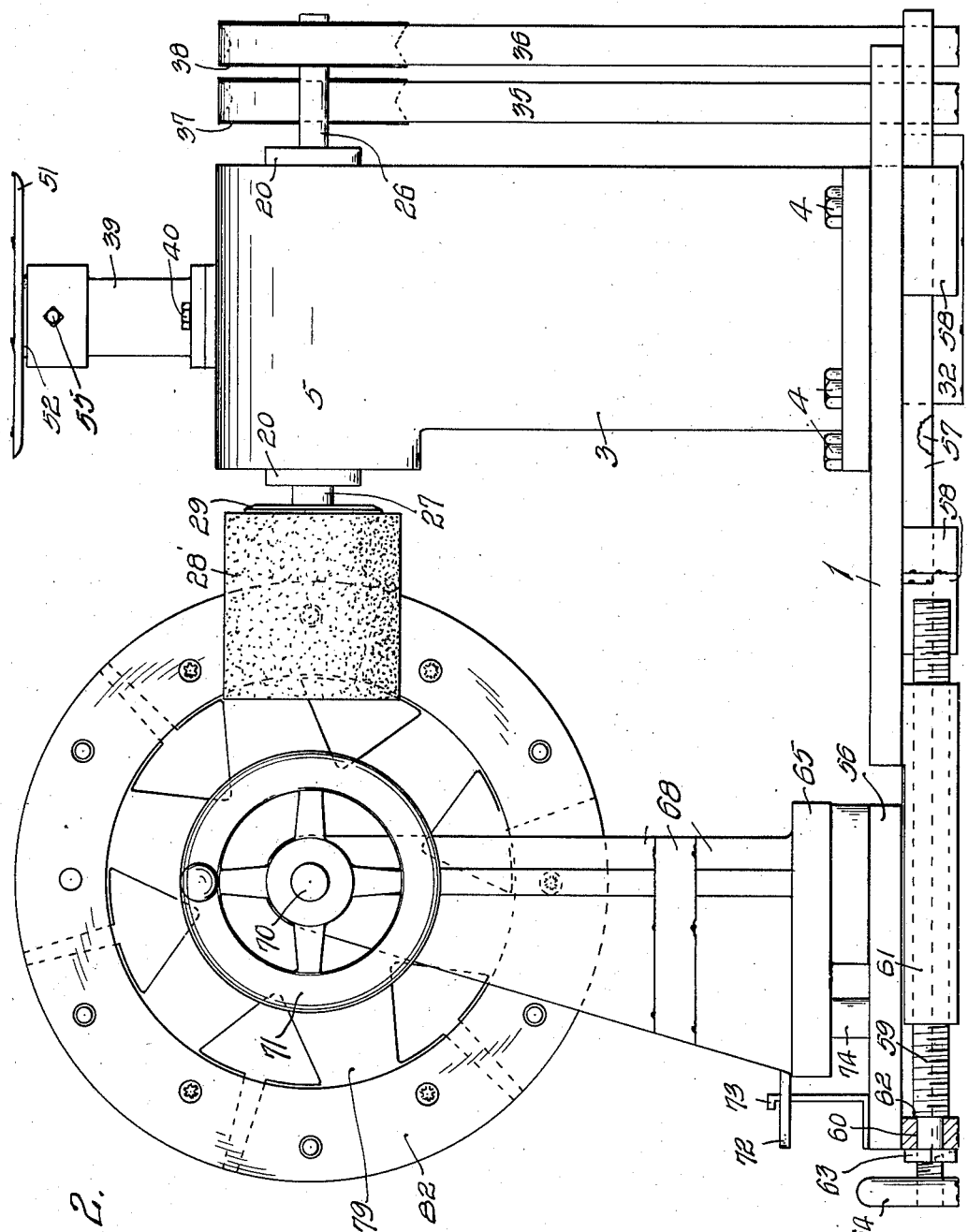
Fig. 2 is a side elevation of the machine with portions thereof broken away and portions thereof in sectional elevation and showing a clutch plate supported in position for grinding the facing thereon.
Figure 3:
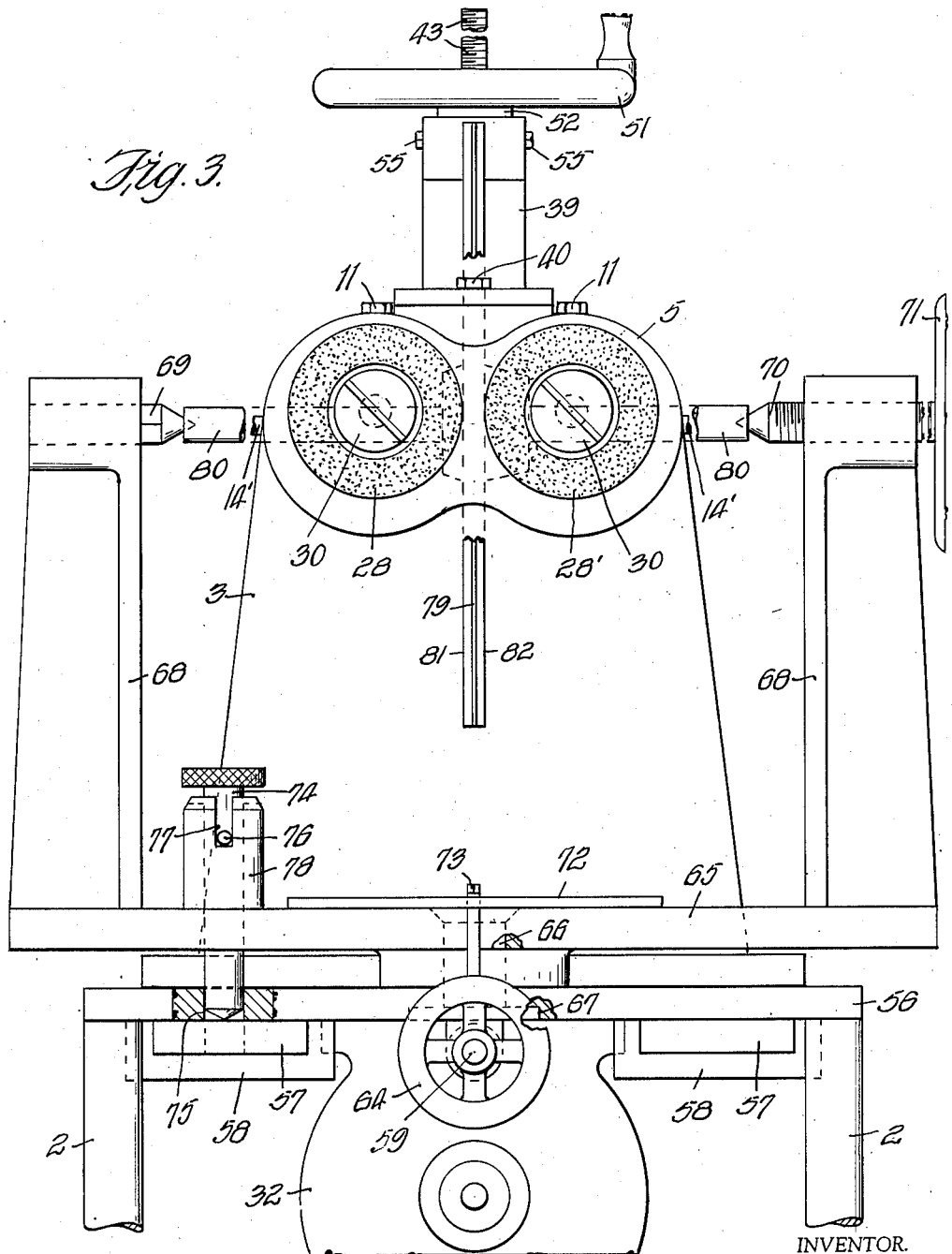
Fig. 3 is a front elevation of the machine with portions thereof broken away and a portion thereof in cross-section and showing a clutch face rotatably supported in position for grinding the facing thereon.

In carrying out the invention, we employ a suitable base plate, or table top 1, supported by a plurality of suitable legs 2.

A suitable casting in the nature of a bearing standard 3 is secured to the base plate 1 by means of suitable fastening devices 4. The bearing standard 3 is formed at its upper end with a suitable head 5 having a pair of like bores extending from its front face 6 to the rear face 7 thereof to provide a pair of suitably spaced bearings designated 8 and 8'. A pair of suitable like cylindrical sleeves designated 9 and 9' are journaled in the bearings 8 and 8', respectively. The sleeves 9 and 9' are each provided with a suitable peripheral groove 10 into which project the inner ends of a suitable guide screw 11 to prevent longitudinal displacement of the sleeves in their respective bearings. The sleeves 9 and 9' are each further provided on opposite sides of the grooves 10 with a groove 12 adapted to receive a suitable packing ring 13. The grooves 10 on the sleeves 9 and 9' register with a suitable passage or bore 14 through which a lubricant is forced from a suitable fitting 14' so as to enter the peripheral grooves 10 on the sleeves and from which grooves the lubricant is transmitted through a plurality of suitable passages 15 to the interior of the cylindrical sleeves 9 and 9', the purpose of which will be apparent hereinafter. Each cylindrical sleeve 9 and 9' is provided with a suitable longitudinal bore 16 eccentric thereto, and, which is enlarged in diameter at the ends thereof, as at 17, to provide shoulders 18 against which seat suitable bearings 19 held against displacement by means of apertured plugs 20, which plugs have screw threaded engagement with the ends of the sleeves 9 and 9'. Each plug 20 has its inner face recessed, as at 21, and adapted to receive a suitable packing 22.

Suitable driven shafts 23 and 23' are receivable in the bore sleeves 9 and 9', respectively, in axial relation to the bores 16 thereof, and they are reduced in diameter, at each end, as at 24, to pass through the opposed bearings 19, and, the shafts are further reduced in diameter beyond the reduced sections 24, as at 25, at the forward end of each driven shaft, and, as at 26, to the rear end of each driven shaft so as to pass through the apertured plugs 20. The forward section 25 of each driven shaft is provided with a suitable sleeve bushing 27 adjacent the front plug 20.

Suitable grinding wheels 28 and 28' are secured to the front sections 25 of the driven shafts 23 and 23', respectively. As shown, the grinding wheels are clamped between a suitable washer 29 which engages the forward end of the sleeve bushings 27, and a suitable flange 30 on suitable fastening devices 31 having screw threaded engagement with the forward ends of the driven shafts 23 and 23', respectively.

The means for rotating each driven shaft consists of an electric motor 32, preferably so placed that the driving centers between the motor and grinding wheels remain the same distance apart, and the motor drive shaft is provided with suitable pulleys designated 33 and 34, over which ride belts 35 and 36, respectively, which belts, in turn, ride over pulleys 37 and 38, respectively secured to the rear reduced end sections of the driven shafts 23 and 23' respectively. This arrangement, it will be apparent rotates the driven shafts and the grinding wheels secured thereto in the same general direction and at substantially the same speed.

In order to change or adjust the distance between the driven shaft centers and the grinding wheels carried thereby, we employ means for turning the sleeves 9 and 9' in unison, in either direction, and, as the driven shafts 23 and 23' are eccentric to the sleeves 9 and 9', it will be apparent that when the sleeves are turned in clockwise movement, the driven shafts and the grinding wheels secured thereto will be moved toward each other to lessen the space between the grinding wheels, and that when the shafts are turning anti-clockwise through movement of the sleeves 9 and 9', that they will be moved away from each other to widen the space or gap therebetween.

In one embodiment of the invention, as shown, the means employed for turning the sleeves includes a suitable bracket 39 secured to the head 5 of the bearing standard 4, by means of suitable fastening devices 40. The bracket 39 is provided with a head 41 provided with an opening serving as a bearing 42 for a suitable screw threaded stem 43, which is not in screw threaded engagement with the bearing 42, but which bearing merely serves as a guide for the screw threaded stem 43. The screw threaded stem is adapted to project upwardly and downwardly in its movement a suitable distance beyond the upper end of the bearing head 41 and the lower end of the bearing head, and the lower end of the screw threaded stem 43 is provided with a non-screw threaded portion 44 of greater diameter than the stem 43 to provide an upper shoulder 45 to serve as a stop to limit upward movement of the stem. The lower end of the stem portion 44 is flanged outwardly, as at 46. Secured to the flange 46 by suitable fastening devices 47, and depending therefrom, are a pair of rack gears designated 48 and 48', which racks are arranged back to back with a plurality of spaced coiled springs 49 disposed therebetween.

The rack gears 48 and 48' pass through a suitable opening in the bearing head 5 of the bearing standard 4 between the sleeves 9 and 9', and the teeth of rack gears 48 and 48' operatively engage gear teeth 50 and 50' formed on the sleeves 9 and 9', respectively.

A suitable hand wheel 51 has screw threaded engagement with stem 43 and it is provided with a depending boss 52 and rotatable within a flanged bearing 53 suitably secured to the head 41 of the bracket 39. The hand wheel boss 52 is provided with a peripheral groove 54 for receiving the inner ends of one, or more, suitable guide elements 55 having screw threaded connection with the flanged bearing 53 to prevent upward displacement of the hand wheel when rotating same, so as to cause the screw threaded stem 43 to be raised and lowered relative to the hand wheel for raising and lowering the rack gears 48 and 48' for turning the sleeves 9 and 9' in the desired directions, in unison, to move the driven shafts 23 and 23' and the grinding wheels 28 and 28' carried by the forward ends thereof either toward, or away from each other, as desired through eccentric motion.

Co-operating with the foregoing mechanism, is mechanism for rotatably supporting a clutch plate with and without clutch facings or linings secured to the side faces thereof, and, to shift the axis of the clutch plate to various angles to the axis of the grinding wheels herein before described.

The co-operating mechanism above referred to consists of an auxiliary base plate 56 serving as an extension for the base plate 1 and disposed adjacent the forward end thereof. The auxiliary base plate 56 is slidably mounted relative to the base plate 1 and is supported in position by means of slide members 57 suitably secured to the lower face of the auxiliary base plate 56 and slidably mounted in and carried by suitable socket members 58 secured to the lower face of the base plate 1. In order to permit the auxiliary base plate to be moved toward and away from the base plate 1, we employ in one embodiment thereof, a screw threaded member 59 journaled at its forward end in a bearing 60 depending from the forward end of the auxiliary base plate 56, and beyond the bearing, screw threadedly connected with an internally screw threaded sleeve 61 secured to and disposed below the base plate 1 and projecting forwardly therefrom. In order to prevent longitudinal displacement relative to the bearing 60, the forward end of the screw threaded shaft is reduced in diameter to provide a shoulder 62 engaging the rear face of the bearing 60 and a nut 63 is carried by the screw threaded member 59 and engages the front face of the bearing 60. A hand wheel 64 is secured to the forward end of the screw threaded shaft 59 by means of which the shaft is turned in either direction to move the auxiliary base plate 56 back and forth relative to the base plate 1.

Mounted on the auxiliary base plate 56 is a turn table or plate 65 provided with a depending pivot pin 66 journaled in the auxiliary base plate 56, which pin is provided with a nut 67 secured to the lower end of the pivot pin 66 and locked against the lower face of the auxiliary base plate 56. An upstanding post 68 is located at each end of the turn table 65 and to one of these posts a trunnion or centering pin 69 is secured in fixed relation thereto, and the other post is provided with a trunnion or centering pin 70 having screw threaded connection therewith and in axial alignment with fixed trunnion or centering pin 69. The screw threaded trunnion or centering pin is provided with a hand wheel 71 for turning same in either direction to move it toward and away from the fixed trunnion or centering pin 69.

A protractor gauge 72 is secured to the turn table 65 and projects forwardly therefrom and co-operating therewith is an indicator or pointer 73 which is secured to the auxiliary base plate 56 so that one can readily observe the number of degrees the turn table has been turned relative to its normal or zero position relative to the indicator or pointer 73.

A turn table locking device is employed to hold the turn table in fixed relation to the auxiliary base plate 56 and, as shown, it consists of a plunger 74 movable downwardly into an opening 75 in the auxiliary base plate 56. When it is desired to unlock the turn table 65 to swing the same in either direction, the plunger is elevated or extracted from the opening 75 and given a half turn so as to raise a cross pin 76 secured to the plunger 74, upwardly out of slots 77 in a bearing 78, which supports the plunger, so that the cross pin rests on top of the bearing 78.

A clutch plate designated 79 to be serviced, if not true, is first straightened by suitable tools by supporting it on a shaft 80 rotatably supported by and between the trunnions or centering pins 69 and 70. The auxiliary plate 56, in this instance, is retracted from the base plate 1 so that the edge of the clutch plate will not strike the grinding wheels. This is usually done before facings 81 and 82 are secured in the usual manner to the clutch plate.

After facings have been applied or secured to the clutch plate, the clutch plate is rotatably supported by the centering pins in the same manner as when straightening the clutch plate, and the auxiliary base plate is moved toward the base plate 1 until the clutch facings are disposed between the grinding wheels 28 and 28'. The grinding wheels are then adjusted toward each other to engage the facing surfaces with the desired amount of grinding pressure. During rotation of the grinding wheels, the faced clutch plate is also rotated by hand, and during the grinding operation, the high points in the facings are removed and the faces smoothed to reduce the diameter of the facings to a uniform thickness. If the clutch plate is not dished, the clutch supporting plate shaft is disposed at a right angle to the axis of the grinding wheels, but if the clutch plate is dished, the turn table can be swung around the desired number of degrees to grind the clutch facings simultaneously.

There are, as one is aware who is familiar with the clutch plate art, many different designs of clutch plates and facings therefor, but regardless of any design now on the market, it has been found that the facing, or facings, regardless of their design, may be readily smoothed by grinding them between the grinding wheels hereinbefore described by rotatably supporting the faced clutch plate in advance of grinding wheels and interposing the facings between the rotatable grinding wheels so as to be acted upon thereby. Also the peripheral face of a clutch plate and its facings may be ground down to a predetermined diameter by forcing the peripheral faces of the clutch plate and its facings against the front face of one of the grinding wheels.

The many advantages of the herein described invention will readily suggest themselves to those skilled in the art to which it appertains.

From the foregoing description, it is evident that a simple device for this purpose has been disclosed, but it is to be understood that we do not desire to restrict, or limit ourselves to the very details of the construction shown and described, which is merely illustrative, it being obvious that changes, not involving the exercise of invention, may be made without conflicting or departing from the spirit of the invention within the scope of the appended claims.

What we claim is:

1. A device for servicing automotive and like clutch plates having facings secured thereto, comprising a base member, a standard secured to the base member, a pair of bearings formed in the standard, a pair of sleeve like members mounted in said bearings in spaced relation, a suitable bearing positioned within each end of each sleeve like member, means for holding the sleeve bearings in position, a driven shaft passing through each sleeve like member and supported by each sleeve bearing eccentric to the longitudinal axis thereof, a grinding member secured to the forward end of each driven shaft, means for simultaneously oscillating the sleeves rotatably to adjust them toward and away from each other to accommodate the faced portion of a clutch plate to be serviced in the space provided therebetween, means disposed in advance of the grinding members for rotatably supporting the clutch plate to be serviced by grinding operation to reduce the faced portion of the clutch plate to a uniform thickness throughout the face areas thereof, and means for shifting the position of the clutch plate being serviced relative to the grinding faces of the grinding member and means for moving the means for rotatably supporting the clutch plate to be serviced toward and away from the grinding members.

2. In combination, a head structure having a pair of spaced parallel horizontally disposed cylinders extending therethrough, sleeves having eccentric bores mounted in the cylinders, means preventing longitudinal displacement of the sleeves in their respective cylinders, anti-friction bearings secured in position at the ends of the sleeves, a driven shaft mounted in the bearings of each sleeve, a grinding wheel attached to each shaft, gear teeth formed on the peripheral face of each sleeve, rack-gears meshing therewith, and means for simultaneously actuating the rack-gears for imparting simultaneous turning movement to the sleeves for eccentrically moving the grinding wheels toward and away from each other for changing the spacing therebetween.

3. A device of the class described having, in combination, a pair of rotatably mounted shafts, grinding wheels on the shafts, means for changing the spacing between said grinding wheels, said means including rotatably mounted sleeves for supporting the shafts in eccentric relation thereto, gears on the sleeves, rack gears meshing with said gears, means for actuating the rack gears, and a clutch plate supporting structure movable toward and away from the ends of the grinding wheels and in the general direction of the longitudinal axis of said wheels.

4. A device of the class described having, in combination, a pair of rotatably mounted shafts, grinding wheels on the shafts, means for changing the spacing between said grinding wheels, said means including rotatably mounted sleeves for supporting the shafts in eccentric relation thereto, gears on the sleeves, rack gears meshing with said gears, means for actuating the rack gears, a clutch plate supporting structure movable toward and away from the ends of the grinding wheels and in the general direction of the longitudinal axis of said wheels, and means for rotatably mounting said clutch plate supporting structure.

5. A device of the class described having, in combination, a table, a head supported by the table, a pair of spaced sleeves mounted in said head, a shaft rotatably carried by each sleeve in eccentric relation thereto, grinding wheels carried by said shafts, means between the sleeves for rotating the sleeves to change the spacing between the grinding wheels, a clutch plate supporting structure slidably and rotatably mounted on the table for movement toward and away from the grinding wheels in the direction of the longitudinal axis of said wheels.

6. In a grinding machine of the class described, a table, a head secured to the table, spaced sleeves mounted in the head in side by side parallel relation, shafts rotatably carried in the sleeves and arranged in eccentric relation to the sleeves, grinding wheels on the shafts, means between the sleeves for rotating same to change the spacing between the wheels, a work support slidably mounted on the opposite end of the table from the head for movement toward and away from the wheels, and means for rotatably adjusting said work support.

7. A device of the class described having, in combination, a table, a supporting head secured thereto, the head having a pair of spaced parallel horizontally disposed bores extending from the front face to and through the rear face thereof, sleeves rotatably mounted in said bores, bearings carried in the ends of said sleeves in eccentric relation thereto, driven shafts journaled in said bearings, grinding wheels fixed to one end of said shafts, means preventing longitudinal displacement of the sleeves, and means for simultaneously turning the sleeves for moving the driven shafts to which the grinding wheels are attached toward and away from each other to change the spacing therebetween.

8. In combination, a pair of opposed grinding wheels eccentrically adjustable toward and away from each other, a work supporting structure, said structure including a turn table, means slidably mounting the turn table, means for locking the table against turning movement, spaced uprights projecting from said table, and work carrying shaft supporting means carried at the upper ends of said uprights to permit the shaft and work carried thereby to be rotated relative to grinding wheels, and means for moving the work supporting structure toward and away from the grinding wheels.

HOWARD B. ELDRIDGE.
CARL E. KLEIN.